United States Patent [19]

Osmialowski

[11] 4,454,208
[45] Jun. 12, 1984

[54] PRESSURE CONTACT TAB/COVER CONSTRUCTION FOR ELECTROCHEMICAL CELLS

[75] Inventor: Victor R. Osmialowski, Brook Park, Ohio

[73] Assignee: Union Carbide Corporation, Danbury, Conn.

[21] Appl. No.: 480,694

[22] Filed: Mar. 31, 1983

[51] Int. Cl.³ .............................................. H01M 2/20
[52] U.S. Cl. ................................... 429/163; 429/174; 429/177; 429/185; 429/94
[58] Field of Search ............... 429/163, 164, 174, 177, 429/185, 94, 171–173, 211, 121, 122

[56] References Cited

U.S. PATENT DOCUMENTS

| | | | |
|---|---|---|---|
| 3,081,367 | 3/1963 | Field et al. | 429/94 |
| 3,470,025 | 9/1969 | Yehiely | 429/94 X |
| 3,951,687 | 4/1976 | Takamura et al. | 429/94 |
| 4,332,867 | 6/1982 | Tsuda et al. | 429/122 X |

FOREIGN PATENT DOCUMENTS 2100917 1/1983 United Kingdom .

*Primary Examiner*—Anthony Skapars
*Attorney, Agent, or Firm*—William E. Dickheiser

[57] ABSTRACT

A sealed galvanic cell having a top cover assembly comprised of an inner cover having at least one aperture therein through which electrolyte can be dispensed into the cell and through which a conductive tab, in electrical contact with one of the cell's electrodes, is passed and held in electrical contact with a conductive outer cover by the clamping coaction of the two covers.

8 Claims, 2 Drawing Figures

4,454,208

PRESSURE CONTACT TAB/COVER CONSTRUCTION FOR ELECTROCHEMICAL CELLS

FIELD OF THE INVENTION

This invention relates to an improved construction of sealed galvanic cells having a two-piece cover assembly wherein the inner cover has at least one aperture therein through which electrolyte may be rapidly dispensed and quickly absorbed into the container.

BACKGROUND OF THE INVENTION

A continuing concern in the manufacture of galvanic cells is that electrolyte may creep through a sealed interface of the cell and leak out of the cell. Electrolyte leakage may shorten cell life and can also cause a corrosive deposit to form on the exterior surface of the cell which detracts from the cell's appearance and marketability. These corrosive salts may also damage the device in which the cell is housed. Electrolyte leakage occurs in cell systems having aqueous or nonaqueous electrolytes, such as organic solvent-based electrolytes and liquid inorganic cathode-electrolytes for example those based on thionyl chloride and sulfuryl chloride. Electrolytes such as alkaline electrolytes have an affinity for wetting metal surfaces and are known to creep through a sealed interface of a galvanic cell.

Much effort has been expended in the past in trying to achieve a means for reducing such electrolyte leakage in cells. Among the approaches adopted in the prior art is that described in U.S. Pat. application No. 391,421, filed on June 23, 1982. This application relates to a construction of galvanic cells wherein a two-piece cover is employed. At least one aperture is provided through the inner cover, through which electrolyte may be rapidly dispensed and quickly absorbed into a container having cell components therein. Utilizing this cell construction, electrolyte may be added in a manner which effectively prevents the sealing surfaces of the cell from becoming wetted with electrolyte, thus reducing the problem of electrolyte leakage.

A problem involved with such cell construction arises from the fact that the electrode collector tab is welded to the inner surface of the cell's inner or outer cover. This welding step occasionally leads to cell shorting due to cutting of the separator by movement of the tab during the welding procedure and/or during the positioning of the outer cover. In addition, this welding requirement makes automation of the cell manufacture operation difficult.

It is therefore an object of the present invention to provide an improved construction of cells having a two-piece cover, the inner cover of which has at least one aperture therein through which electrolyte may be dispensed into the cell container, which construction will reduce the danger of cell shorting due to tearing of the separator during cell assembly.

It is a further object of this invention to provide a construction of cells having a two-piece cover, the inner cover of which has at least one aperture therein through which electrolyte may be dispensed, which construction is readily adaptable to an automated manufacturing process.

It is a further object of this invention to provide a process for the production of sealed galvanic cells having a two-piece cover construction in which the danger of cell shorting due to tearing of the separator during cell assembly is reduced.

The foregoing and additional objects of this invention will become apparent from the following description and accompanying drawings and examples.

SUMMARY OF THE INVENTION

This invention relates to a compression sealed galvanic cell including a container having a base, a sidewall and an open end, and housing a first electrode in electrical contact with said container, a second electrode, a separator between the electrodes and electrolyte therein in ionic contact with said first electrode and said second electrode; an electrically conductive tab having a first end and a second end, said second end extending to and being in electrical contact with said second electrode; and a top cover assembly comprising an inner cover having at least one aperture therein through which electrolyte can be dispensed into said container and an outer electrically conductive cover positioned over said inner cover, at least a portion of the inner surface of the outer cover being contiguously associated with the corresponding outer surface of the inner cover; characterized in that said first end of the electrically conductive tab is positioned through an aperture in the inner cover and inserted between the contigously associated portions of said inner cover and outer cover such that said first end of the conductive tab is held in electrical contact with the outer cover by the clamping coaction of the inner cover and the outer cover.

The inner cover of the cells of this invention may comprise a peripheral collar which functions as a sealing gasket such that said inner cover functions as both a cover and as a gasket. In such circumstances, the inner cover is composed of a nonconductive material. The cell may contain a separate sealing gasket, in which case the inner cover may be composed of conductive or of nonconductive material, and may or may not comprise said peripheral collar, said inner cover having only a covering function. Unless otherwise noted, as used hereinafter the term 'inner cover' shall encompass inner covers having both covering and gasket functions as well as inner covers having only a covering function.

In general, the cells of this invention will be of a rolled configuration, i.e. a cylindrical configuration in which a flexible negative electrode and a flexible positive electrode are rolled together with separator layers therebetween. In order to maintain contact between the conductive outer cover and one of the rolled electrodes a conductive strip or tab is employed. The tab is often rolled with the electrodes so as to be properly positioned in the rolled configuration. The tab is preferably positioned such that it extends substantially vertically through an aperture in the inner cover. The tab may be kept in electrical contact with the electrode by welding or by providing a multiplicity of projections on such tab, which projections penetrate into said electrode. This latter tab construction is described in U.S. Pat. No. 4,049,882.

The tab is inserted through an aperture in the inner cover and positioned between the outer surface of the inner cover and the inner surface of the outer cover. In at least the area over which the tab is positioned, the outer surface of the inner cover and the inner surface of the outer cover are contiguously associated such that after the cell has been compression sealed the tab is held in place and is in electrical contact with the conductive top cover.

The width and length of the tab will vary in accordance with the size of the cell and the size of the aperture in the inner cover. The aperture is typically circular having a radius of from about 0.03 inch (0.08 cm) to about 0.06 inch (0.15 cm). Preferably, for inner covers having radii of 0.5 inch (1.27 cm) and smaller the aperture is located in the center of the inner cover and has a radius of about 0.045 inch (0.114 cm).

The tab may be made of any electrically conductive material such as copper, monel, nickel, stainless steel and the like. Stainless steel is the prefered material for cells utilizing oxyhalides as cathode-electrolytes or for $MnO_2$/organic electrolyte cells.

Suitable materials for the outer cover and inner cover, when said inner cover has only a covering function are nickel, copper, tin, steel, monel, stainless steel, nickel-plated steel, copper clad steel, tin clad steel and alloys and combinations thereof and other conductive materials that will not corrode or otherwise deteriorate when in contact with the cell components. Additionally, when only serving a covering function the inner cover need not be electrically conductive and may be composed of a material such as a polymeric fluorocarbon, polyvinyl, polyethylene, polypropylene, polystyrene, polyester, nylon or the like. Moreover, said inner cover may be metallic and coated with a nonconductive material.

When the inner cover serves both covering and gasket functions, said inner cover is composed of a nonconductive material. The sealing gasket, if present, or the inner cover if such cover performs a gasket function has to be stable in the presence of cell electrolyte and other cell materials and can be selected from materials such as fluorocarbons such as polytetrafluoroethylene, fluorinated ethylene-propylene polymer, ethylene copolymer with fluorinated ethylene-propylene, polychlorotrifluoroethylene, perfluoro-alkoxy polymer and the like; polyvinyl; polyethylene; polypropylene; polystyrene; nylon; polyester and other materials obvious to one skilled in the art.

The thicknesses of the inner and outer covers may be selected so as to minimize the height of the cover assembly. This is particularly important when the overall dimensions of the cell are fixed and a maximum volume must be devoted to the cell electrodes. The inner cover should have a thickness sufficient to sustain its integrity during the evacuation of the cell, resisting outside pressure when the pressure within the cell is approximately 20 mm Hg. The outer cover should have a thickness such that the cover assembly will withstand radial and normal cell sealing forces without detrimental deformation.

Generally, when the radius of the cell is 0.5 inch (1.27 cm) or smaller and the inner cover is metallic, the inner cover has a thickness of from about 0.001 inch (0.003 cm) to about 0.005 inch (0.013 cm) and the outer cover will preferably have a thickness of from about 0.006 inch (0.015 cm) to about 0.015 inch (0.030 cm). Preferably the inner cover has a thickness of about 0.005 inch (0.013 cm) and the outer cover has a thickness of about 0.010 inch (0.254 cm) when the cell has a radius of 0.5 inch (1.27 cm) or smaller.

When the inner cover is composed of a nonmetallic material its thickness will generally be greater depending on the material selected.

The outer cover is positioned over the inner cover with the conductive tab between the contiguous portions of the two covers. The cell can then be sealed in a conventional manner as by radial sealing forces which either compress the sealing gasket between the container sidewall and the peripheries of the covers or compress the inner cover having a gasket function between the container sidewall and conductive top cover, depending on the particular construction of the inner cover employed. Preferably sealing is completed by crimping the uppermost portion of the container sidewall inwardly over the covers.

Electrolyte leakage along the peripheries of the covers can be inhibited as by prior art disclosures in which a space is maintained between the peripheries of the inner and outer covers by inserting a separating member therebetween so as to lengthen the distance which electrolyte must travel to reach the exterior of the cell, as long as the covers are shaped such that the conductive tab is maintained in electrical contact with the upper cover by the clamping coaction of the two covers.

Electrolyte leakage through and beyond the at least one aperture in the inner cover can be substantially eliminated by disposing a sealant between the inner and outer covers around each aperture, as long as the electrical contact of the conductive tab clamped between said covers is not adversely affected. Preferably, the sealant is chosen so as not to be wetted by the cell electrolyte. Depending on the electrolyte, the sealant may be a fatty polyamide, a polymeric silicone, asphalt or a polymeric fluorocarbon.

The cell construction of this invention is suitable for use in cell systems having aqueous or non-aqueous electrolytes such as organic solvent-based electrolyte and liquid inorganic cathode-electrolytes.

In another aspect this invention relates to a method of manufacturing a compression sealed galvanic cell comprising the steps of:

(a) assembling a first electrode, and a second electrode, said second electrode having a conductive tab in electrical contact therewith, and a separator in a container having a base, an upright sidewall and an open end;

(b) disposing an inner cover having at least one aperture therethrough at the open end of the container;

(c) inserting said conductive tab through an aperture in the inner cover and positioning it over a portion of said inner cover;

(d) evacuating air out of the cell container through the at least one aperture in the inner cover;

(e) dispensing electrolyte into the container through the at least one aperture in the inner cover and then readmitting air;

(f) placing at the open end of the container a conductive outer cover having an inner surface which is adapted to be contiguously associated with the outer surface of the inner cover, at least in the portion of the inner cover over which the conductive tab is positioned; and (g) sealing the cell by applying conventional external forces such that the conductive tab is locked in electrical contact with the outer cover by the clamping coaction of the inner and outer covers.

Alternatively, in step (b) a sealing gasket may be disposed between the inner cover and the container.

In the preferred embodiment of the invention the first electrode in electrical contact with the container is positive and the second electrode in electrical contact with the cover assembly is negative.

In a typical embodiment of the process of this invention, wherein the inner cover serves only a covering function, a positive electrode, a separator and a negative electrode are positioned in a conductive container such that one electrode is in electrical contact with the container. A conductive tab is fastened in electrical contact with the second electrode. A sealing gasket which typically comprises an upright vertical sidewall and a radially inwardly extending flange is inserted into the container. An inner cover having at least one aperture therethrough is disposed at the open end of the container. The at least one aperture provides a means for evacuating air from the container as well as for providing a passage for the conductive tab. Preferably, the inner cover rests on the flange of the sealing gasket.

The inner cover is held against the sealing gasket flange to form a temporary seal. The conductive tab is passed through an aperture and positioned over a portion of the inner cover. At the portion over which the conductive tab is positioned, the outer surface of the inner cover is adapted to be contiguously associated with the inner surface of the outer cover which is placed over the inner cover, such that, upon sealing of the cell, the tab is held in electrical contact with the outer cover by the clamping coaction of the inner and outer covers. The air in the container is evacuated and electrolyte is dispensed into the container. This temporary seal prevents electrolyte from wetting the sealing surfaces of the sealing gasket and the inner cover. Since the sealing gasket is already positioned inside the container, electrolyte is precluded from wetting the sealing surfaces between the container sidewall and the sealing gasket. A vacuum on the order of about 20 mm Hg is preferred for removal of most of the air from within the container.

Once the container has been evacuated through the aperture in the inner cover, electrolyte can be dispensed through the same aperture. The vacuum in the container assists the liquid electrolyte to soak into the partial cell assembly. Whereas dispensing electrolyte into the open end of an unevacuated container which houses cell components requires about one minute for 0.3 cc of electrolyte to be absorbed, the same volume of electrolyte is absorbed into an evacuated container having components therein in about two seconds or less.

In the embodiment of this invention wherein a separate seal gasket is not employed, the gasket sealing function is performed by the inner cover which is nonconductive and comprises a peripheral collar. The electrolyte is fed into the cell in a manner similar to that employed when a separate seal gasket is present.

Thus the inner cover of the present invention provides means for removing air from within the container and for quickly dispensing electrolyte into a container having cell components therein while maintaining the cell sealing surfaces in a dry, electrolyte-free condition.

Due to the aperture in the inner cover, the inner cover is not effective as a cell closure. An outer cover therefore is placed over the inner cover such that the conductive tab is held in electrical contact with the outer cover by the clamping coaction of the contiguously associated portions of the inner and outer covers.

The present invention will become more apparent from the following description thereof when considered together with the accompanying drawings which are set forth as being exemplary of embodiments of the present invention and are not intended to be in any way limitative thereof.

DETAILED DESCRIPTION OF THE DRAWINGS

Figure 1:
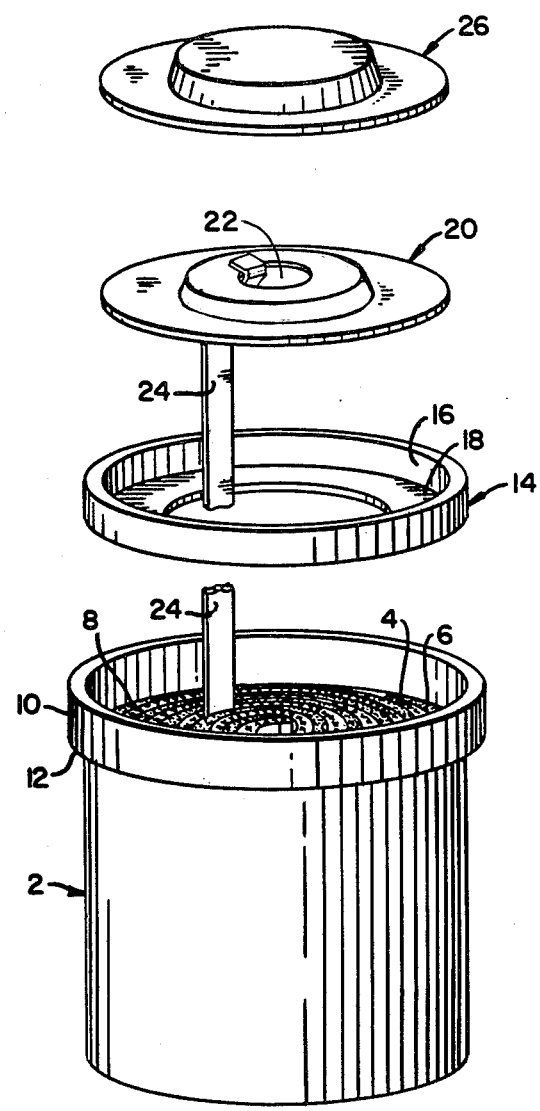
FIG. 1 is an expanded perspective view of the components of a galvanic cell in accordance with one embodiment of this invention.

Turning now to FIG. 1 there is shown a container 2 in which there has been inserted a rolled electrode assembly comprising a flexible negative electrode 4, a flexible positive electrode 6, separator 8 therebetween and an electrically conductive tab 24 in contact with the negative electrode and extending upward therefrom. The uppermost portion of the container sidewall 10 extends above step 12 in the container sidewall. Sealing gasket 14 is shown above the container and comprises a vertical sidewall 16, whose outward-facing surface is sized to be congruent with the inner surface of the uppermost portion of container sidewall 10, and a radially inwardly extending flange 18 which can be seated upon the step 12 in the container sidewall 10. Alternatively, in an embodiment not shown the inner cover 20 performs the function of sealing gasket 14 and comprises a peripheral collar.

Above the sealing gasket 14 there is shown an inner cover 20 having an aperture 22 through the center thereof. The end of tab 24 is inserted through aperture 22 and positioned over the outer surface of inner cover 20. For demonstration purposes, conductive tab 24 in FIG. 1 has been drawn in elongated form.

During assembly, the peripheral edge of the inner cover 20 is held against the flange 18 of the sealing gasket 14 forming a temporary seal. With the gasket 14 and inner cover 20 placed over the open end of the container 2, air in the rolled cell assembly is removed by evacuation through the aperture 22 in the inner cover 20. Thereafter the required volume of electrolyte is dispensed through aperture 22. The vacuum in the container 2 facilitates the absorption of electrolyte into and around the cell components.

An outer cover 26 is shown positioned over the inner cover 20. The inner surface of outer cover 26 is adapted to be contiguously associated with the outer surface of inner cover 20 at least in the portion of the outer surface of inner cover 20 over which conductive tab 24 is positioned. After electrolyte has been absorbed into and around the cell components in container 2 and air readmitted into the container, the outer cover 26 is placed over the inner cover 20 and the cell is sealed by radially compressing the sidewall 16 of the sealing gasket 14 between the uppermost portion of the container sidewall 10 and the peripheries of the inner and outer covers 20 and 26. Sealing is completed by crimping the uppermost portion of the container sidewall inwardly over the covers. This sealing locks conductive tab 24 into electrical contact with outer cover 26 by the clamping coaction of covers 20 and 26.

In this manner a two-piece cover is provided which permits rapid dispensing and absorption of electrolyte into a container having cell components therein while maintaining the sealing surfaces of the cell essentially electrolyte-free so as to obtain an effectively leak-proof cell. Due to the positioning of the conductive tab and pressure-contact seal thereof, the danger of tearing the separator during cell assembly is reduced.

Figure 2:
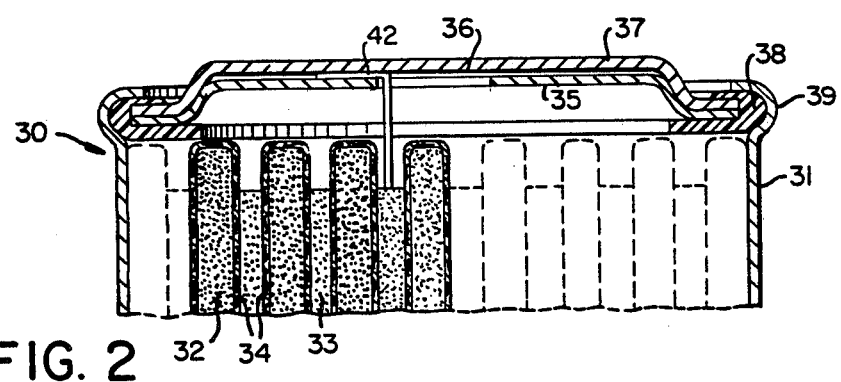
FIG. 2 is a partial sectional side elevation view taken through an assembled cell in accordance with one embodiment of this invention wherein the inner cover has one aperture therethrough.

There is shown in FIG. 2 a partial side elevation view of an assembled cell identified by reference number 30 in accordance with one embodiment of this invention. A container 31 is shown wherein is housed a rolled positive electrode 32, a rolled negative electrode 33 and rolled separators 34 therebetween.

The cover assembly comprises an inner cover 35 having an aperture 36 in the center thereof through which air had been evacuated and through which electrolyte had been dispensed into the container 31, and an outer cover 37 which is capable of withstanding cell sealing forces without detrimentally deforming. A conductive tab 42 is secured to the negative electrode 33 in a position such that said tab may be extended substantially vertically through aperture 36. Conductive tab 42 is secured in electrical contact with outer cover 37 by the clamping coaction of inner cover 35 and outer cover 37. A sealing gasket 38 is compressively disposed between the container sidewall 39 and the peripheries of the covers 35 and 37.

EXAMPLE

Cells were produced in accordance with the previously described invention as shown in FIG. 2 as follows:

A cylindrical container having a 0.447 inch (1.135 cm) outer diameter and a 0.420 inch (1.067 cm) height was filled with a rolled electrode assembly which comprised a 0.063 gram lithium negative electrode layer on an expanded metal carrier and a 0.91 gram positive electrode mix layer (comprised of 88 weight percent $MnO_2$, 3 weight percent polytetrafluoroethylene, 8 weight percent graphite and 1 weight percent calcium hydroxide) which electrode layers were rolled together and separated from each other by polypropylene separators. A conductive tab made of stainless steel was welded to the carrier of the negative electrode. A polyester sealing gasket having a flange was positioned at the open end of the container. An inner cover having a 0.413 inch (1.049 cm) outer diameter and a 0.005 inch (0.013 cm) thickness and a 0.090 inch (0.229 cm) diameter aperture in the center thereof was pressed against the flange of the sealing gasket. The conductive tab was inserted through the aperture in such inner cover and positioned over a portion of the upper surface of the inner cover. Air within the container was evacuated in less than 1 second to about 20 mm Hg through the aperture in the cover, after which about 0.31 ml of electrolyte comprised of 50 volume percent propylene carbonate, 50 volume percent dimethoxyethane, and 1 molar $LiCF_3SO_3$ was dispensed through the aperture and absorbed in about one-half second. Air was then readmitted into the container.

An outer cover having a 0.413 inch (1.049 cm) outer diameter, a thickness of 0.010 inch (0.254 cm) and having a inner surface which was adapted to be contiguously associated with that portion of the outer surface of the inner cover over which the conductive tab was positioned, was placed over the inner cover. The cell was sealed by radially compressing the sealing gasket between the container sidewall and the peripheries of the covers and by curling the top edge of the container sidewall over the insulated cover peripheries. This compression sealing resulted in the conductive tab being locked into place between the inner and outer covers, forming a pressure contact between the tab and top cover.

In order to test the effectiveness of the pressure contact of the cells of this invention vis-a-vis cells having a welded contact, additional cells were constructed in accordance with the Example in U.S. Pat. Application Ser. No. 391,421.These comparative cells were identical to those of the present invention except that the conductive tab was welded to the inner cover rather than locked into place by pressure between the inner and outer covers.

Cell impedance was measured using an alternating current method. It was found that the pressure contact of the present invention was nearly as good as that of the welded contact, with the pressure contact having impedance values at 1 K Hz averaging only about 6 percent higher than the welded contact.

Twelve fresh cells having the pressure contact of this invention, along with 9 fresh cells having a welded contact, were subjected to several service tests at room temperature and $-20°$ C. until a two volt cutoff was reached. These tests and results are summarized in Table I below:

TABLE 1

| | | Service Capacity to 2 Volt Cutoff | | | |
| --- | --- | --- | --- | --- | --- |
| | | Pressure Contact | | Welded Contact | |
| Test Schedule | Temperature | Average | Range | Average | Range |
| 50 ohm continuous | Room temperature | 144 min | 119–159 min | 138 min | 117–152 min |
| 1000 ohm continuous | Room temperature | 71 hr | 62–76.5 hr | 69 hr | 66–72 hr |
| 1000 ohm continuous | $-20°$ C. | 59 hr | 57–63 hr | 61 hr | 54–67 hr |

The service test data above indicate that cells employing the pressure contact tab/cover construction of this invention possess utility comparable to that of cells having a welded tab/cover contact. The method of assembling cells utilizing this invention reduces the danger of tearing the separator during cell assembly and is readily adaptable to automation.

What is claimed is:

1. A compression sealed galvanic cell including a container having a base, a sidewall and an open end, and housing a first electrode in electrical contact with said container, a second electrode, a separator between the electrodes and electrolyte therein in ionic contact with said first electrode and said second electrode; an electrically conductive tab having a first end and a second end, said second end extending to and being in electrical contact with said second electrode; and a top cover assembly comprising an inner cover having at least one aperture therein through which electrolyte can be dispensed into said container and an outer electrically conductive cover positioned over said inner cover, at least a portion of the inner surface of the outer cover being contiguously associated with the corresponding outer surface of the inner cover; characterized in that said first end of the electrically conductive tab is positioned through an aperture in the inner cover and inserted between the contiguously associated portions of said inner cover and outer cover such that said first end of the conductive tab is held in electrical contact with the outer cover by the clamping coaction of the inner cover and the outer cover.

2. The galvanic cell of claim 1 wherein the conductive tab is positioned such that said tab extends substantially vertically through said aperture.

3. The galvanic cell of claim 2 wherein the conductive tab is composed of stainless steel.

4. The galvanic cell of claim 2 wherein one aperture is defined in the center of the inner cover.

5. The galvanic cell of claim 1 wherein a sealing gasket is disposed between the inner cover and the cell container.

6. The galvanic cell of claim 5 wherein the conductive tab is positioned such that said tab extends substantially vertically through said aperture.

7. The galvanic cell of claim 6 wherein the conductive tab is composed of stainless steel.

8. The galvanic cell of claim 5 wherein one aperture is defined in the center of the inner cover.

* * * * *